(12) United States Patent
Wei et al.

(10) Patent No.: US 8,487,690 B2
(45) Date of Patent: Jul. 16, 2013

(54) DUAL MODE CHARGE PUMP

(75) Inventors: Wei-Hsin Wei, Hsinchu County (TW);
Jwin-Yen Guo, Hsinchu County (TW);
Teng-Hung Chang, Kaohsiung (TW);
Ming-Jun Hsiao, Hsinchu County (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 0 days.

(21) Appl. No.: 13/435,277

(22) Filed: Mar. 30, 2012

(65) Prior Publication Data

US 2012/0249224 A1    Oct. 4, 2012

(30) Foreign Application Priority Data

Apr. 1, 2011    (TW) .............................. 100111664 A

(51) Int. Cl.
*G05F 1/10*    (2006.01)
(52) U.S. Cl.
USPC ......................................................... 327/536

(58) Field of Classification Search
USPC .......................................... 327/530, 534–537
See application file for complete search history.

(56) References Cited

U.S. PATENT DOCUMENTS 7,714,660 B2 * 5/2010 Lesso et al. ................... 330/297

* cited by examiner

*Primary Examiner* — Lincoln Donovan
*Assistant Examiner* — Sibin Chen
(74) *Attorney, Agent, or Firm* — Muncy, Geissler, Olds & Lowe, PLLC

(57) ABSTRACT

A dual mode charge pump is operable in a first mode or a second mode for providing positive and negative output voltages that can be stabilized by adjusting the charging time of two terminals of a flying capacitor or by adjusting the charging/discharging time of the positive and negative voltage output terminals. The dual mode charge pump can apply to a much wider input supply voltage range with less numbers of power switches, thus requiring less die area and lower costs. Moreover, the dual mode charge pump can precisely define a common mode voltage, thus making the common voltage drift smaller and less load dependent, especially when the output supply voltages are under different load conditions.

7 Claims, 11 Drawing Sheets

DUAL MODE CHARGE PUMP

FIELD OF THE INVENTION

The present invention is related generally to a dual mode charge pump and, more particularly, to a dual mode charge pump for providing positive and negative supply voltages.

BACKGROUND OF THE INVENTION

Class H amplifiers are known to improve the efficiency of conventional Class AB amplifiers. Traditional Class G and Class H amplifiers require multiple power supplies for providing positive and negative supply voltages. Recently, combining a voltage generation method to generate a set of positive and negative supply voltages with selectable modes (to generate different bipolar supply voltages) was found to be an efficient and cost effective way to implement Class G or Class H amplifiers.

A power generation method with a dual mode charge pump is first proposed by U.S. Pat. Application Publication No. 2008/0044041, which uses two flying capacitors and eight controlled switches. Later, U.S. Pat. No. 7,626,445 proposes an improved dual mode charge pump which uses only one flying capacitor and six switches to generate bipolar supply voltages, thereby reducing the die area and costs. However, the generated bipolar supply voltages are all related to the input voltage VDD of the dual mode charge pump, as being equal to either ±VDD or ±cVDD, where c is a fractional ratio number. For example, in U.S. Pat. Application Publication No. 2008/0044041, referring to FIG. 1, when the positive supply voltage Out+ is 1.6V, the negative supply voltage Out− must be −1.6V, and the input voltage Vbatt can only be 1.6V or a fractional times, for example ⅔, of 1.6V, and additional capacitors are needed to implement the fractional times of 1.6V. The input voltage Vbatt is fully limited by the output supply voltages Out+/Out−, thus reducing flexibility of system applications.

Moreover, in the known dual mode charge pump as disclosed by U.S. Pat. Application Publication No. 2008/0044041 and shown in FIG. 1, the common mode voltage Vcm is loosely controlled by the switching actions, resulting in larger common voltage drift, especially when the load currents drawn from the supply voltage output terminals Out+ and Out− are not balanced.

SUMMARY OF THE INVENTION

An objective of the present invention is to provide a dual mode charge pump circuit for generating positive and negative output voltages that are independent of its input voltage.

According to the present invention, a dual mode charge pump is operable in a first mode or a second mode for providing positive and negative output voltages that can be stabilized by adjusting the charging time of two terminals of a flying capacitor or by adjusting the charging/discharging time of the positive and negative voltage output terminals. The dual mode charge pump can apply to a much wider input supply voltage range with less numbers of power switches, thus requiring less die area and lower costs. Moreover, the dual mode charge pump can precisely define a common mode voltage, thus making the common voltage drift smaller and less load dependent, especially when the output supply voltages are under different load (currents) conditions.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
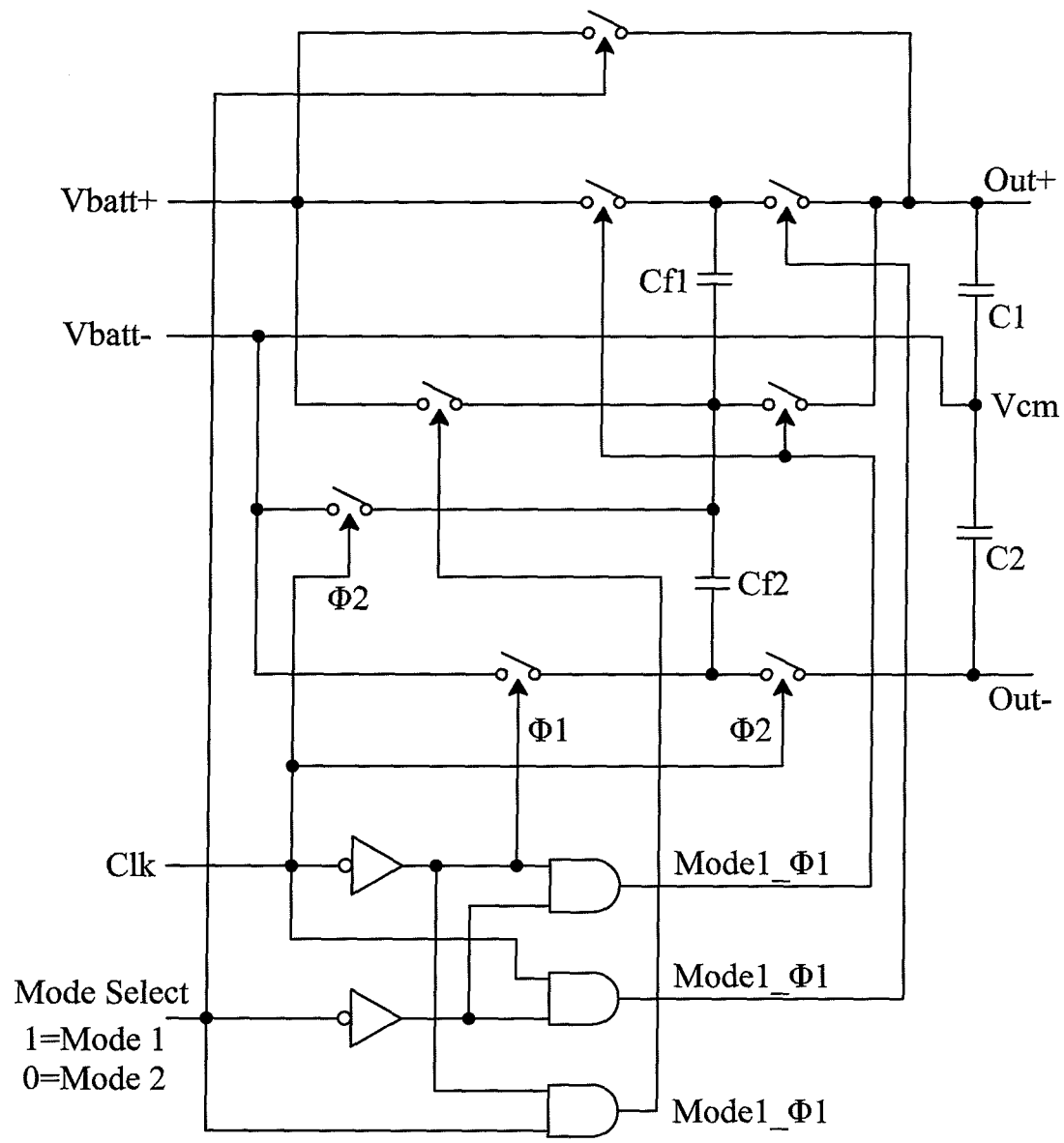
FIG. 1 is a circuit diagram of a conventional dual mode charge pump.
Figure 2:
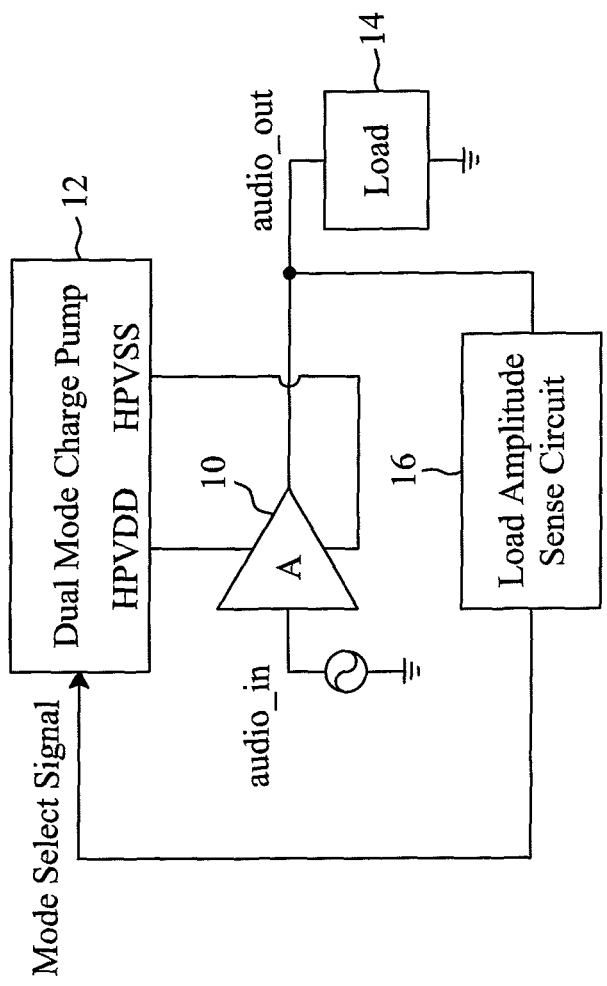
FIG. 2 is a block diagram of an amplifier system using a dual mode charge pump according to the present invention.

As shown in FIG. 2, an amplifier system has a Class G or Class H amplifier as its audio output device 10 for amplifying an input signal audio_in to generate an output signal audio_out for a load 14, a dual mode charge pump 12 operating in a first mode or a second mode responsive to a mode select signal to provide multiple sets of supply voltages HPVDD and HPVSS to power input terminals of the audio output device 10, and a load amplitude sense circuit 16 for sensing the amplitude of the output signal audio_out to identify the condition of the load 14 and determining the mode select signal according to the condition of the load 14 to switch the dual mode charge pump 12 between the first and second modes.

Figure 3:
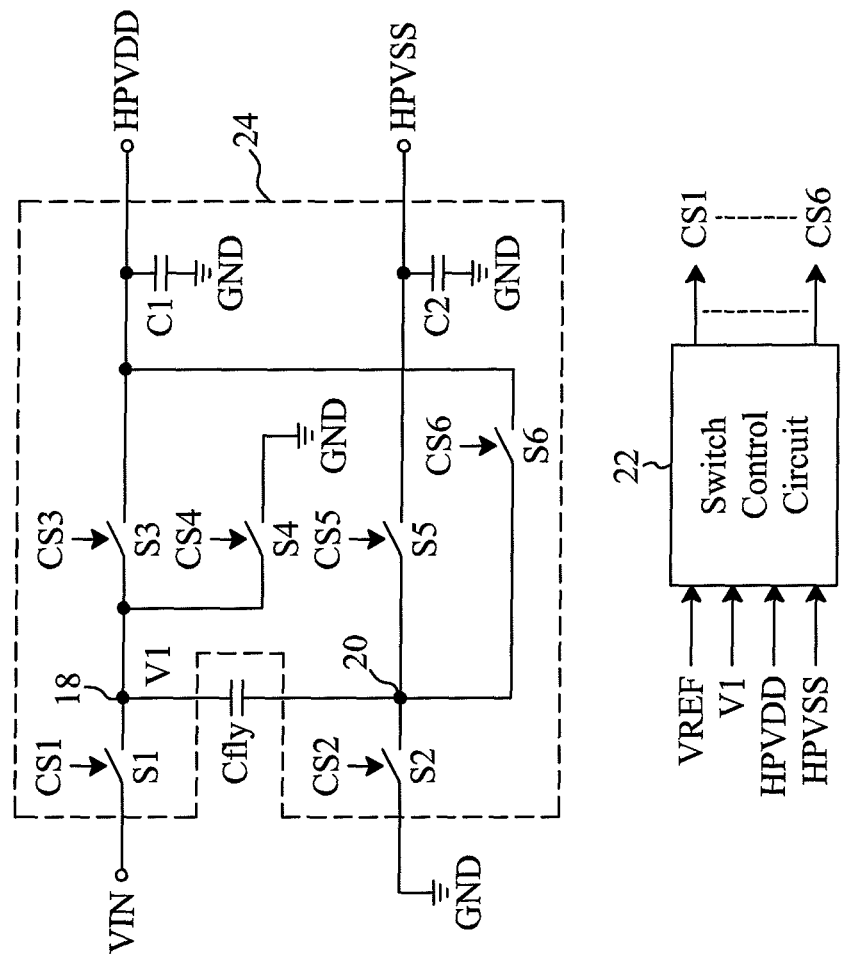
FIG. 3 is a circuit diagram of an embodiment for the dual mode charge pump shown in FIG. 2.

FIG. 3 is a circuit diagram of an embodiment for the dual mode charge pump 12 shown in FIG. 2, which includes a flying capacitor Cfly, a switch control circuit 22 and a switch capacitor network 24. In the switch capacitor network 24, a switch S1 is connected between a power input terminal VIN and a first terminal 18 of the flying capacitor Cfly, a switch S2 is connected between a ground terminal GND and a second terminal 20 of the flying capacitor Cfly, a switch S3 is connected between the first terminal 18 of the flying capacitor Cfly and the voltage output terminal HPVDD of the dual mode charge pump 12, a switch S4 is connected between the first terminal 18 of the flying capacitor Cfly and the ground terminal GND, a switch S5 is connected between the second terminal 20 of the flying capacitor Cfly and the voltage output terminal HPVSS of the dual mode charge pump 12, a switch S6 is connected between the second terminal 20 of the flying capacitor Cfly and the voltage output terminal HPVDD of the dual mode charge pump 12, and bulk capacitors C1 and C2 are connected to the voltage output terminals HPVDD and HPVSS respectively. Control signals CS1-CS6 for the switches S1-S6 are provided by the switch control circuit 22.

Figure 4:
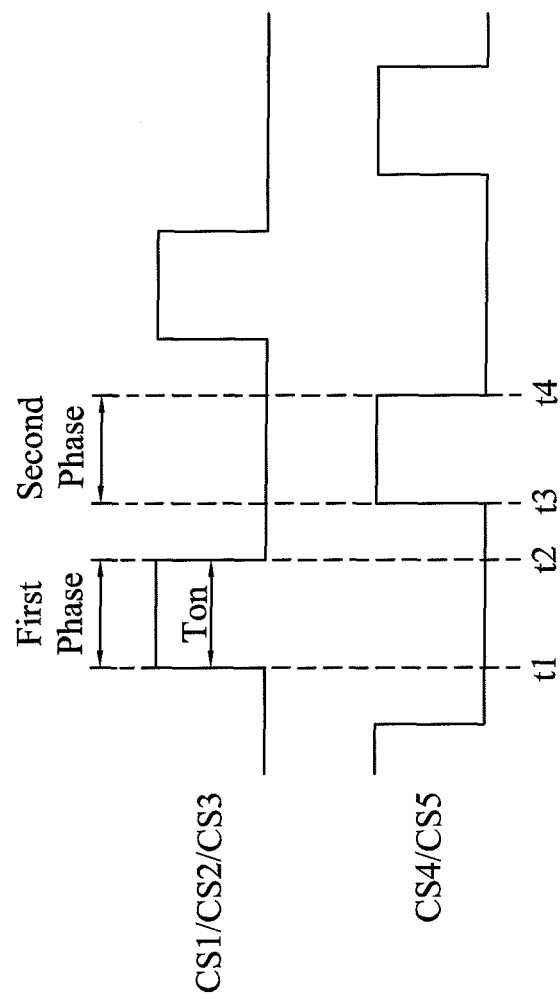
FIG. 4 is a timing diagram of the switch control signals of the dual mode charge pump shown in FIG. 3 in a first mode.
Figure 5:
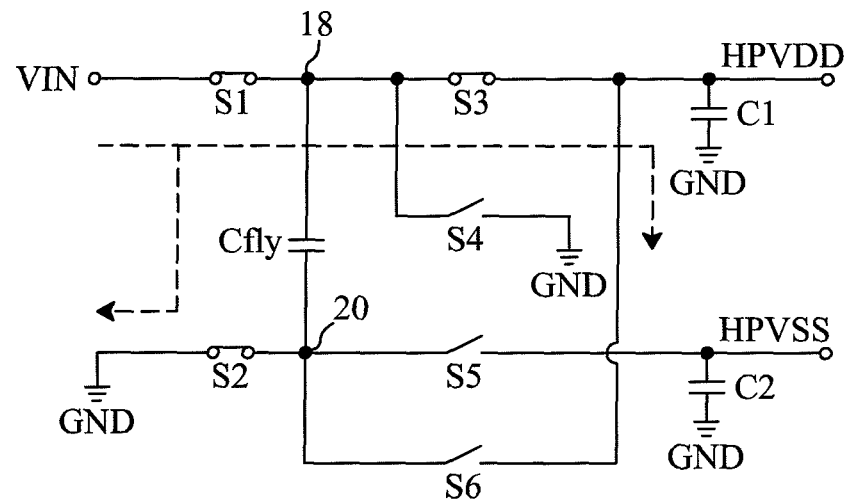
FIG. 5 is a circuit diagram of the switch capacitor network shown in FIG. 3 in a first phase of a first mode.
Figure 6:
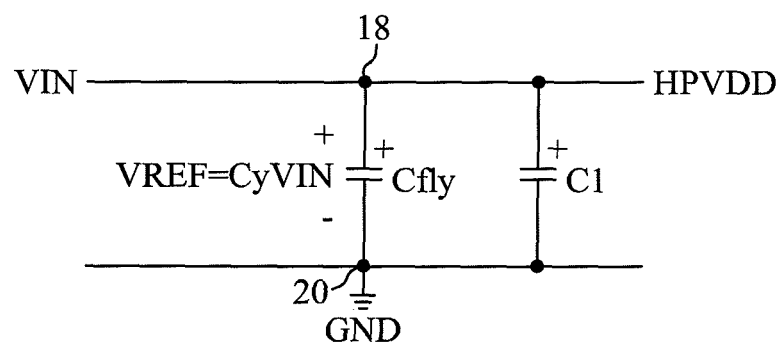
FIG. 6 shows an equivalent circuit of the switch capacitor network shown in FIG. 5.
Figure 7:
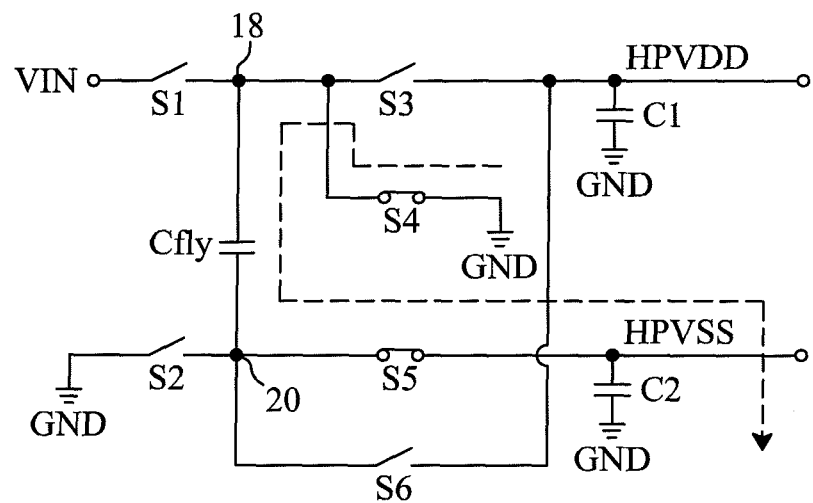
FIG. 7 is a circuit diagram of the switch capacitor network shown in FIG. 3 in a second phase of a first mode.
Figure 8:
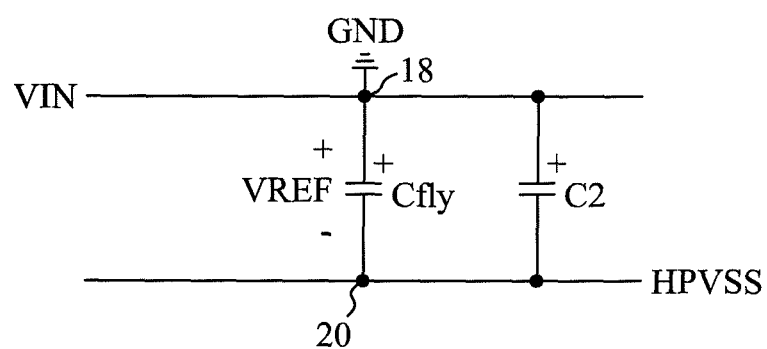
FIG. 8 shows an equivalent circuit of the switch capacitor network shown in FIG. 7.

FIG. 4 is a timing diagram of the control signals CS1-CS5 shown in FIG. 3 in a first mode of the dual mode charge pump 12. Referring to FIGS. 3 and 4, the switch S6 remains off in the first mode, and the first mode includes a first phase and a second phase. In the first phase of the first mode, as shown from time t1 to time t2, the switches S1, S2 and S3 are on, and the switches S4 and S5 are off, as shown in FIG. 5, whose equivalent circuit is shown in FIG. 6. In this time period, the input voltage VIN charges the flying capacitor Cfly and the bulk capacitor C1, and the switch control circuit 22 detects the voltage V1 at the first terminal 18 of the flying capacitor Cfly, and compares the same with a reference voltage VREF to control the on-time Ton of the switch S1, thereby making the voltage across the flying capacitor Cfly and the bulk capacitor C1 equal to the reference voltage VREF, which may be any fractional times of the input voltage VIN, c×VIN of. Thus, in the first phase of the first mode, the voltage at the voltage output terminal HPVDD is equal to VREF. In the second phase of the first mode, as shown from time t3 to time t4, the switches S1, S2 and S3 are off and the switches S4 and S5 are on, as shown in FIG. 7, whose equivalent circuit is shown in FIG. 8. In this time period, the flying capacitor Cfly discharges the voltage output terminal HPVSS to make the voltage at the voltage output terminal HPVSS equal to −VREF. In this embodiment, the absolute values of the voltages HPVDD and HPVSS are both equal to the voltage VREF between the first and second terminals 18 and 20 of the flying capacitor Cfly. However, in other embodiments, the switch control circuit 22 may make the absolute values of the voltages HPVDD and HPVSS smaller than the voltage VREF between the first and second terminals 18 and 20 of the flying capacitor Cfly by adjusting the pulse widths of the control signals CS3 and CS5.

Figure 9:
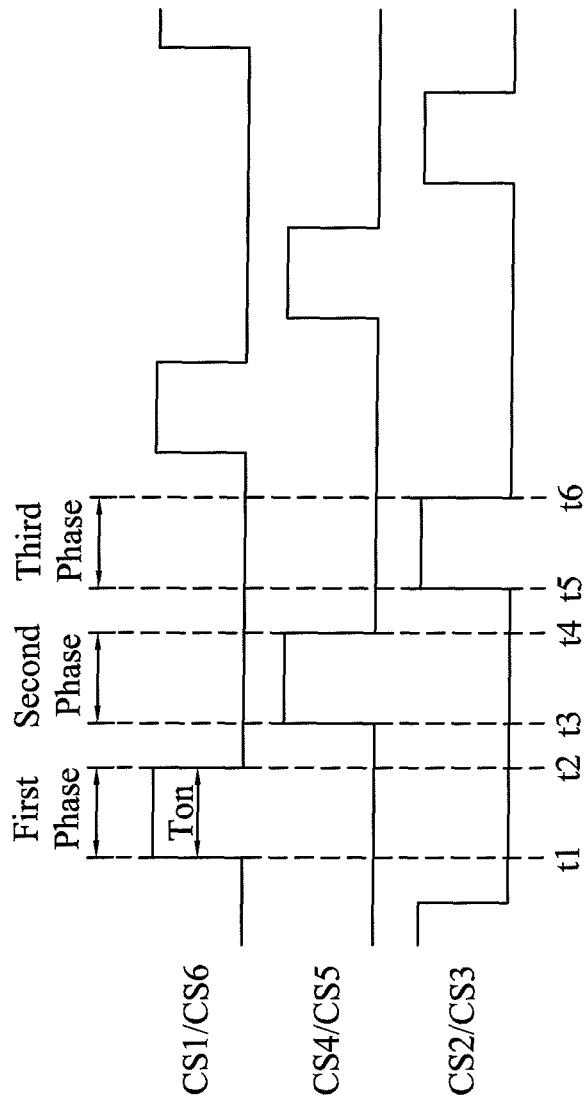
FIG. 9 is a timing diagram of the switch control signals of the dual mode charge pump shown in FIG. 3 in a second mode.
Figure 10:
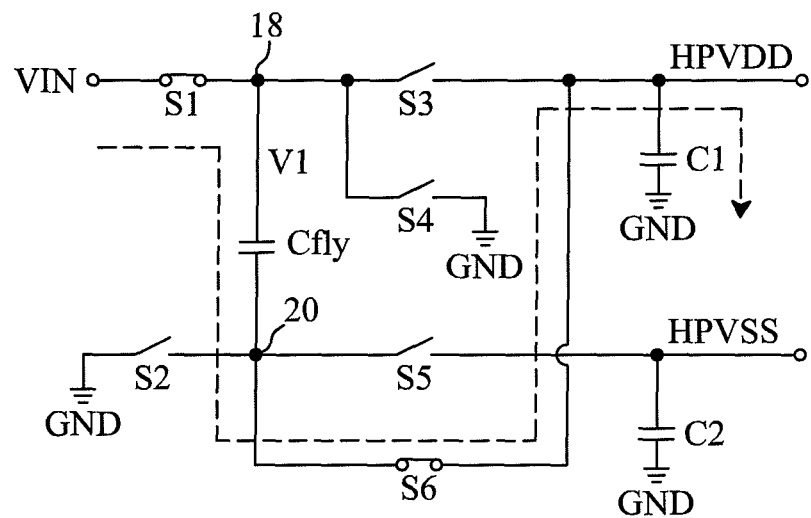
FIG. 10 is a circuit diagram of the switch capacitor network shown in FIG. 3 in a first phase of a second mode.
Figure 11:
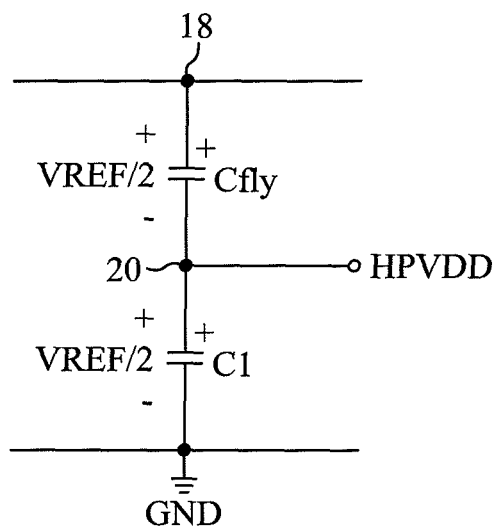
FIG. 11 shows an equivalent circuit of the switch capacitor network shown in FIG. 10.
Figure 12:
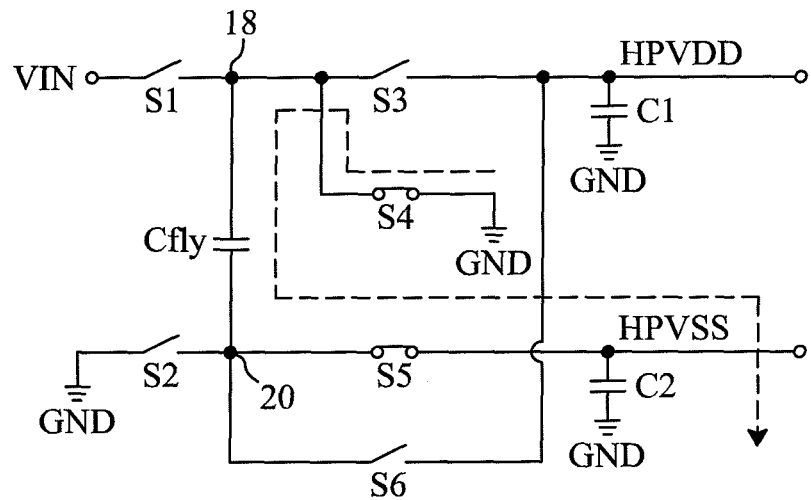
FIG. 12 is a circuit diagram of the switch capacitor network shown in FIG. 3 in a second phase of a second mode.
Figure 13:
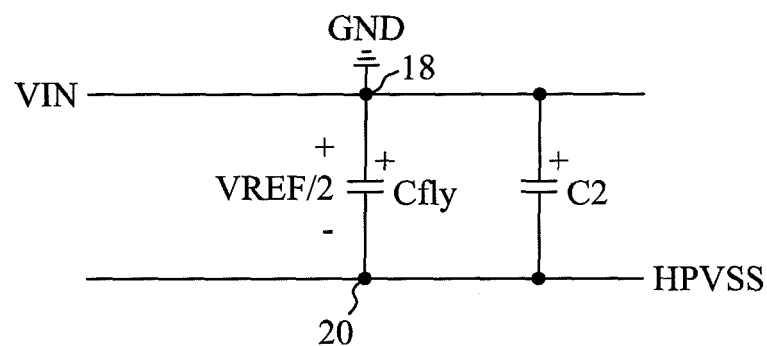
FIG. 13 shows an equivalent circuit of the switch capacitor network shown in FIG. 12.
Figure 14:
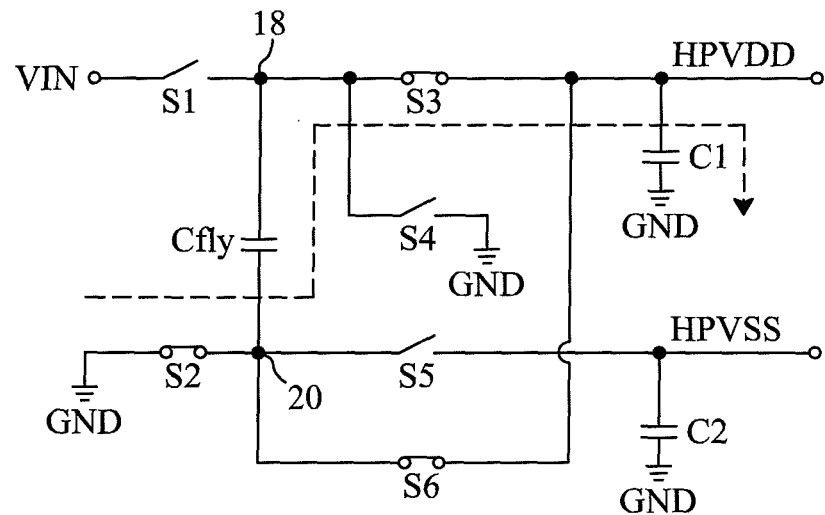
FIG. 14 is a circuit diagram of the switch capacitor network shown in FIG. 3 in a third phase of a second mode.
Figure 15:
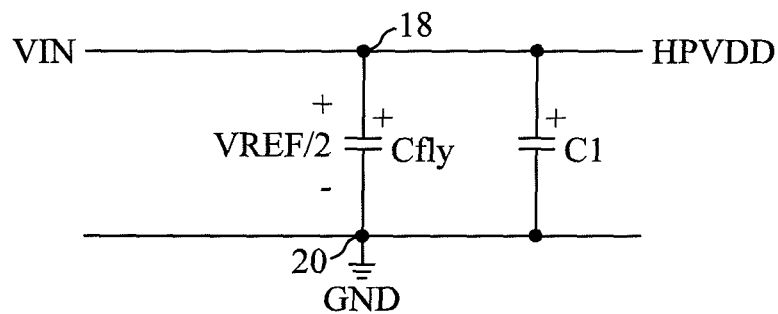
FIG. 15 shows an equivalent circuit of the switch capacitor network shown in FIG. 14.

FIG. 9 is a timing diagram of the control signals CS1-CS6 shown in FIG. 3 in the second mode of the dual mode charge pump 12. Referring to FIGS. 3 and 9, the second mode includes a first phase, a second phase and a third phase. In the first phase of the second mode, as shown from time t1 to time t2, the switches S1 and S6 are on and the other switches are off, as shown in FIG. 10, whose equivalent circuit is shown in FIG. 11. In this time period, the input voltage VIN charges the flying capacitor Cfly and the bulk capacitor C1 that are connected in series between the power input terminal VIN and the voltage output terminal HPVDD, and the switch control circuit 22 detects the voltage V1 at the first terminal 18 of the flying capacitor Cfly, and compares the same with the reference voltage VREF to control the on-time Ton of the switch S1, thereby making the voltage between the first terminal 18 of the flying capacitor Cfly and the ground terminal GND equal to VREF. At this time, the flying capacitor Cfly and the bulk capacitor C1 equally share the reference voltage VREF, meaning that the voltages across the flying capacitor Cfly and across the bulk capacitor C1 are both VREF/2. In the second phase of the second mode, as shown from time t3 to time t4, the switches S4 and S5 are on and the other switches are off, as shown in FIG. 12, whose equivalent circuit is shown in FIG. 13, in which the flying capacitor Cfly and the bulk capacitor C2 are connected in parallel between the power input terminal VIN and the voltage output terminal HPVSS, and the first terminal 18 of the flying capacitor Cfly is grounded, so that the charges of the flying capacitor Cfly are transferred to the bulk capacitor C2, making the voltage at the voltage output terminal HPVSS equal to −VREF/2. In the third phase of the second mode, as shown from time t5 to time t6, the switches S2 and S3 are on and the other switches are off, as shown in FIG. 14, whose equivalent circuit is shown in FIG. 15, in which the flying capacitor Cfly and the bulk capacitor C1 are connected in parallel, and the second terminal 20 of the flying capacitor Cfly is grounded, so that the charges of the flying capacitor Cfly and of the bulk capacitor C1 are redistributed, making the voltage at the voltage output terminal HPVDD equal to VREF/2. In this embodiment, the absolute values of the output voltages HPVDD and HPVSS are both equal to VREF/2, one half of the voltage VREF between the first and second terminals 18 and 20 of the flying capacitor Cfly. However, in other embodiments, the switch control circuit 22 may make the absolute values of the voltages HPVDD and HPVSS smaller than one half of the voltage VREF between the first and second terminals 18 and 20 of the flying capacitor Cfly by adjusting the pulse widths of the control signals CS3 and CS5.

As compared with conventional dual mode charge pumps, the input voltage VIN of the dual mode charge pump 12 shown in FIG. 3 is not limited by the positive and negative output voltages HPVDD and HPVSS, and the dual mode charge pump 12 allows the positive and negative output voltages HPVDD and HPVSS to be adjusted by adjusting the pulse widths of the control signals CS1-CS6, thus increasing flexibility of system applications.

Figure 16:
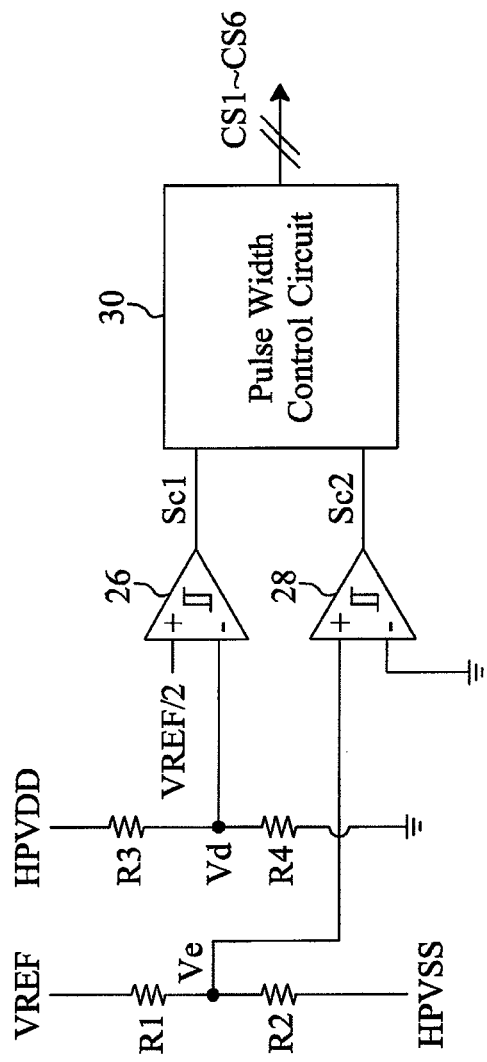
FIG. 16 is a circuit diagram of an embodiment for the switch control circuit shown in FIG. 3.

FIG. 16 is a circuit diagram of an embodiment for the switch control circuit 22 shown in FIG. 3, which includes resistors R1 and R2 connected in series between the reference voltage terminal VREF and the voltage output terminal HPVSS, resistors R3 and R4 connected in series between the voltage output terminal HPVDD and the ground terminal GND for dividing the voltage HPVDD to generate a voltage Vd, a comparator 26 for comparing the voltage Vd with the half reference voltage VREF/2 to generate a comparison signal Sc1, a comparator 28 for comparing the voltage Ve with the ground voltage to generate a comparison signal Sc2, and a pulse width control circuit 30 for generating the control signals CS1-CS6 according to the comparison signals Sc1 and Sc2. The switch control circuit 22 functions to determine the timing and the pulse widths of the control signals CS1-CS6 and thereby control the absolute value of the voltage at the first terminal 18 of the flying capacitor Cfly.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A dual mode charge pump operable in a first mode and a second mode, comprising:
   a power input terminal receiving an input voltage;
   a ground terminal as a relative zero for voltage calculation;
   a first voltage output terminal and a second voltage output terminal;
   a flying capacitor having a first terminal and a second terminal; and
   a switch capacitor network connected to the power input terminal, the ground terminal, the first and second terminals of the flying capacitor, and the first and second voltage output terminals;
   wherein in the first mode a first positive voltage and a first negative voltage of a same first absolute value are generated at the first and second voltage output terminals, respectively, the first absolute value is adjustable even if the input voltage is constant, and the first absolute value is smaller than or equal to a voltage between the first and second terminals of the flying capacitor, and in the second mode a second positive voltage and a second negative voltage of a same second absolute value are generated at the first and second voltage output terminals, respectively, the second absolute value is adjustable even if the input voltage is constant, and the second absolute value is smaller than or equal to a half of the voltage between the first and second terminals of the flying capacitor.

2. The dual mode charge pump of claim 1, wherein the switch capacitor network is operable in a plurality of phases, including a first one for charging the flying capacitor and a second one for discharging the first and second voltage output terminals.

3. The dual mode charge pump of claim 2, further comprising a switch control circuit connected to the switch capacitor network, providing control signals to the switch capacitor network to switch the switch capacitor network between the plurality of phases.

4. The dual mode charge pump of claim 3, wherein the first and second voltage output terminals are connected to power input terminals of an audio output device, respectively.

5. The dual mode charge pump of claim 1, wherein the first and second modes are determined depending on a condition of load between the first and second voltage output terminals.

6. The dual mode charge pump of claim 1, wherein the switch capacitor network comprises a plurality of switches for controlling a charging time of the flying capacitor and a charging/discharging time of the first and second voltage output terminals.

7. The dual mode charge pump of claim 6, further comprising a switch control circuit connected to the switch capacitor network, providing control signals to the switch capacitor network to control on-times of the plurality of switches, thereby adjusting the values of the first and second positive voltages and the first and second negative voltages.

\* \* \* \* \*